United States Patent

[11] 3,599,099

[72] Inventors Akira Tatebayashi;
Totaro Ogura, both of Tokyo, Japan
[21] Appl. No. 705,412
[22] Filed Feb. 14, 1968
[45] Patented Aug. 10, 1971
[73] Assignee Nippon Broadcasting System
Tokyo, Japan
[32] Priority Feb. 15, 1967
[33] Japan
[31] 42/9277

[54] SYSTEM FOR TRANSFERRING AUDIO SYSTEM OUTPUT TO PREDETERMINED BROADCAST SIGNAL
5 Claims, 3 Drawing Figs.

[52] U.S. Cl. 325/311, 179/100.11, 325/64, 325/392, 325/470
[51] Int. Cl. H04b 1/32
[50] Field of Search 325/51, 61, 64, 63, 364, 392, 468, 469, 470, 471, 311; 334/18, 20, 26; 179/15 ST, 100.11

[56] References Cited

UNITED STATES PATENTS

| | | | |
|---|---|---|---|
| 2,647,993 | 8/1953 | Ziffer | 325/392 |
| 2,890,274 | 6/1959 | Guyton | 325/470 X |
| 2,898,400 | 8/1959 | Parmet et al. | 178/5.8 |
| 3,334,187 | 8/1967 | Pampel | 325/470 X |
| 3,383,595 | 5/1968 | Obata | 325/64 |
| 2,173,560 | 9/1939 | Nekolny | 325/155 |

*Primary Examiner*—Benedict V. Safourek
*Attorney*—Burgess, Ryan & Hicks

ABSTRACT: The following specification discloses transmitting and receiving apparatus wherein selected radio programs transmitted from the transmitter have modulated thereon one or more Q signals. The receiver has a first or normal state and a second state wherein it is adapted to receive programs having a selected one of the Q signals modulated thereon. The receiver apparatus is provided with an automatic tuning device for continuously scanning the broadcast band. A carrier wave detector and a Q signal detector are effective to disable the automatic tuning device and to operate a circuit transferring means to switch the receiver from its normal state to its second state, to thus receive the particular program having the Q signal modulated thereon. The receiver returns to its normal state when the Q signal ceases.

Akira Tatebayashi
Totaro Ogura
By Burgess, Ryan & Hicks
ATTYS

SYSTEM FOR TRANSFERRING AUDIO SYSTEM OUTPUT TO PREDETERMINED BROADCAST SIGNAL

The present invention relates to an automatic circuit transfer system for radio or television receivers operable in response to a specific one of a plurality of different Q signals which may be modulated on the radio or television programs received.

Along with the expanded use of the cartridge-type tapes, the need for utilizing the radio receiver or television receiver for the reproduction purpose of these tapes is becoming more and more urgent. In such cases, it is desirable that the receiver be provided with apparatus for assuring the reception of some specific programs such as emergency news, speed reports, or traffic news and the like.

It is therefore one object of the present invention to provide such apparatus for assuring the reception of such programs.

Another object of the present invention is to provide a novel circuit transferring system wherein, if a specific signal is received, the receiving circuit is transferred quickly and without error to the receiving state of such programs.

Still another object of the present invention is to provide a transferring device for the receiving circuit at an economical cost.

A further object of the present invention is to provide a transferring device which, when the receiver is in the receiving position, can be remotely controlled from the transmitting station to operate other and different equipment.

For achieving these objects and to pick up the specific signal during the time when a recorded tape or plate is reproduced through the radio or television receiver, an automatic tuner is provided for automatically tuning all of the frequencies within the broadcasting bands, in order to catch any of the specific signals sent out from certain broadcasting stations. This device can be realized in various ways such as mechanically rotating a variable capacitor, or varying the $\mu$of the tuning coils of the tuning circuit or by utilizing variable capacitance diodes.

The Q signals are modulated on the program being transmitted in a mode different from that of the program. In other words, if the program is amplitude modulated on the carrier the Q signals will be phase or frequency modulated and vice versa. The invention is described hereinafter with respect to an AM program and PM Q signals of different frequencies. However, it will be apparent to those skilled in the art that the system described may be readily converted to any other type of modulation desired.

According to the invention, there is provided a carrier wave detector and when the detector detects any of the carrier waves transmitted from the broadcasting stations, a phase detector which will be explained hereafter will be operated with the simultaneous interruption of the automatic tuning device. However, when a specific signal, that is, so-called "Q" signal is not included in the carrier wave sent out from the broadcasting station, no output signal is obtained from the phase detector, and the automatic tuning device will continue its operation.

For the detection of the phase-modulated "Q" signal, the phase detector and a signal detector are provided according to the present invention, and when the phase detector receives a signal from said carrier wave detector, if the "Q" signal is included in the signal, an output is obtained from the phase detector which, in conjunction with the signal from the carrier wave detector maintains the automatic tuning device in its inoperable condition and which simultaneously operates the signal detector to switch the receiver into its program-receiving state and hearing of the specific program is enabled.

The invention may be better understood by reference to the following description of its preferred embodiment which is taken in conjunction with the accompanying drawings, in which.

As previously stated, the explanation hereinafter is for an exemplary case wherein an APM signaling system (amplitude and phase modulation system) is utilized.

Figure 1:
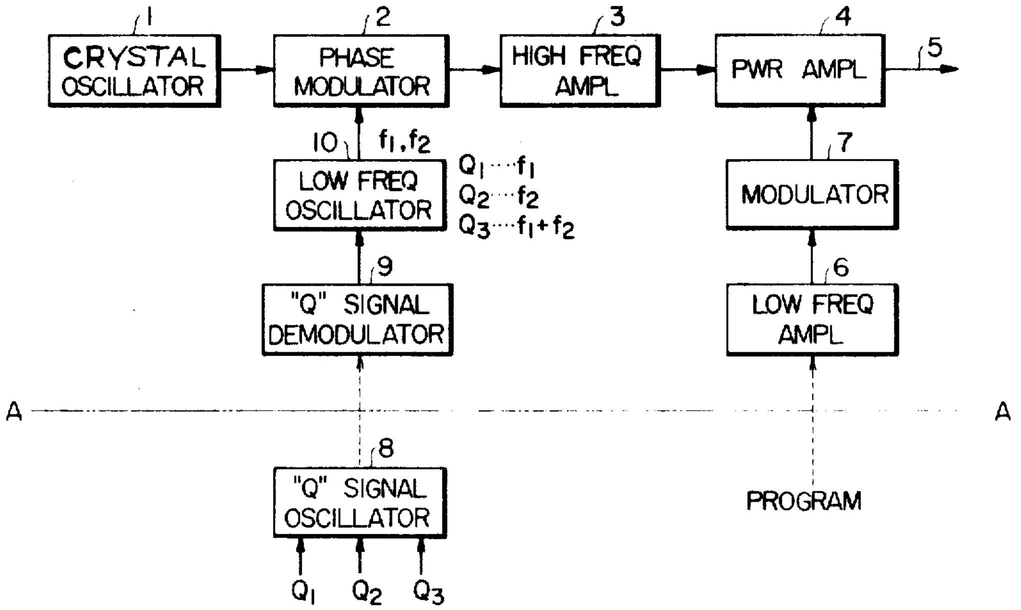
FIG. 1 is a block diagram indicating an embodiment of the transmitting side arrangement in accordance with the present invention.

In FIG. 1, there is shown the preferred embodiment of the transmitting apparatus which comprises the crystal oscillator 1, the phase modulator 2, high frequency amplifier 3 and power amplifier 4, the output of which is adapted to be coupled to an antenna (not shown) by cable 5.

The program, such as a news broadcast, is fed through low frequency amplifier 6 and amplitude modulator 7 and is transmitted from the antenna. The "Q" control signals $Q_1'$, $Q_2'$ and $Q_3'$ are transmitted from the studio, here indicated as being below the line A–A, to the transmitting station where they are demodulated in the "Q" signal demodulator 9, coupled to the low frequency oscillator network 10, which generates the "Q" signals $Q_1$, $Q_2$ and $Q_3$.

As shown in FIG. 1, the "Q" control signals are generated by "Q" signal oscillator 8 and "transmitted" to the transmitting equipment. It is to be understood, however, that direct connection may be made between oscillator 8 and modulator 12, providing the studio and transmitter are in lose proximity.

Figure 3:
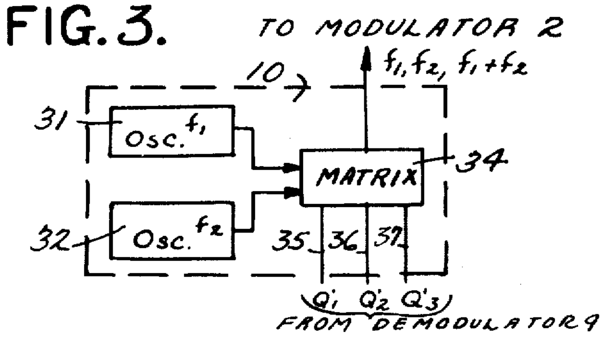
FIG. 3 is a block diagram of the low frequency oscillator network in accordance with the present invention.

As shown in FIG. 3, the low frequency oscillator network 10 comprises two oscillators 31 and 32 operating at frequencies $F_1$ and $F_2$ respectively. These signals are coupled through a conventional matrix 34 to the phase modulator 2 under the control of the signals $Q_1'$, $Q_2'$ and $Q_3'$.

The demodulator 9 generates a signal on either rf the leads 35, 36 or 37 in response to the Q control signals $Q_1'$, $Q_2'$ and $Q_3'$, respectively, which in turn cause the matrix 34 to couple either $F_1$, $F_2$ or $F_1$ and $F_2$ to the phase modulator. These signals correspond to $Q_1$, $Q_2$ and $Q_3$.

It is to be understood that the Q control signals may, in addition to being the actual Q signals as previously indicated, be any form of signal which can be distinguished such as pulse trains, DC voltages directly coupled to the matrix, etc.

Figure 2:
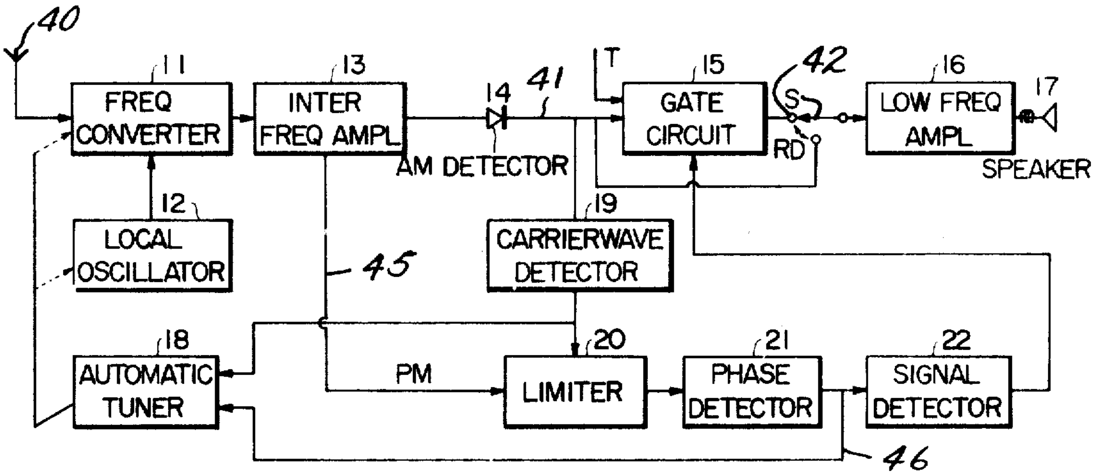
FIG. 2 shows a block diagram indicating the receiving side equipment in accordance with the present invention.

In FIG. 2, a preferred embodiment of the receiver apparatus is shown. Signals are received by antenna 40 and mixed in the frequency converter 11 with the local oscillator frequency from local oscillator 12. The IF signal is amplified in the intermediate frequency amplifier 13 and detected in amplitude detector 14, here shown as a conventional diode detector. From the detector 14 the signal is coupled to the gate circuit 15 by lead 41. The gate circuit 15 is effective to couple either the signal on lead 41 or the signal from lead T, which may be the output from a tape deck, to the output terminal 42. The output terminal 42 is connected through switch S to the low frequency amplifier 16, the output of which drives a suitable speaker 17. The switch S is provided to enable the operator to manually bypass the gate 15 and apply the signal on lead 41 to the low frequency amplifier 16.

The local oscillator 12 and frequency converter 11 are continuously controlled, or tuned, by the automatic tuner 18 in order to "scan" the AM broadcast band, for example. As previously indicated, the automatic tuner may be an electric motor mechanically coupled to variable tuning elements in the oscillator and converter, as well as other well-known automatic turning apparatus.

The carrier wave detector generates an output whenever the IF frequency is present on lead 41. This occurs only when a program is being received. The detector 19 may be of any suitable construction and preferably includes frequency selective means for passing only the IF frequency, and pulse generating apparatus responsive to the detection of the IF signal for applying a step output. The detector may also contain threshold means for preventing response to signals below a predetermined level.

The output of the detector 19 is coupled to the automatic tuner 18 and the limiter 20. When an output from the detector 19 exists, the limiter enabled to pass the phase modulated signal from the IF amplifier on lead 45 to the phase detector 21 which generates an output only if the "Q" signals are present. The output from the phase detector is coupled by lead 46 to the automatic tuner 18 such that if signals are present from both the detector 19 and 21 the automatic tuner is stopped in order to receive the program having the Q signal modulated thereon. The automatic tuner 18 includes a conventional "AND" circuit for accomplishing this function. Thus, it can be seen that should no Q signal be present or no carrier, the tuner will continue its scan and similarly once a Q signal ceases, the tuner will resume its scan.

The output from the phase detector 21 is also coupled through the signal detector 22 to the gate circuit 15 whereby, when a particular Q signal is present, the gate will be switched from its normal state, i.e., coupling the lead T to the terminal 42, to its second state wherein the lead 41 is coupled to the terminal 42. In this manner the receiver is transferred from its normal state, i.e., tape playback to the program receiving state to enable the hearing of the program on which the particular Q signal was modulated. When the Q signal ceases, the receiver is returned to its first state.

The gate circuit 15 may be of any conventional and well-known type including monostable flip-flops, gated amplifiers, relays, transistor switches and the like, the details of which are not shown herein as they are well known to those skilled in the art. The signal detector may similarly be of many different types, however, it is preferred to employ a matrix structure similar to that shown in FIG. 2. In this type of detection, the signal from the phase detector would be passed through band pass filters, tuned to $F_1$ and $F_2$ and then through a matrix to three output terminals corresponding to $Q_1$, $Q_2$ and $Q_3$ to thus, in effect, reverse the encoding process in FIG. 1. A suitable switch may be provided to select a desired one of the three outputs.

The carrier wave detector functions to couple the power supply to the limiter 20 by closing a relay or transistor switch to thereby prevent spurious signals from passing through the limiter and actuating the gate when no program is being received Although the detector 19 is shown as being coupled to the lead 41, it may also be coupled to the antenna or output of the frequency converter 11 and tuned to be responsive to one or more specific carrier frequencies to thus obtain a selective circuit-transferring system.

The second input to the tuner may, instead of being taken off at the output from signal detector 22 such that the automatic tuner would be stopped only for carriers modulated with a predetermined one of the Q signals.

In order to allow manual tuning of the receiver, the switch S may be mechanically coupled to the automatic tuner whereby when switch "S" is operated to bypass the gate circuit 15 and enable radio only operation, the automatic scanner will be disabled to permit manual tuning so that any desired station can be received.

The operation of the present invention will be described from the time of reception of a specific program while a recorded tape or plate is simultaneously being reproduced. The automatic tuner 18 is continuously scanning the broadcasting frequency band and catches the specific program whenever it is transmitted, and the carrier wave detector 19, upon sensing the carrier wave of this specific program, generates an output which is coupled to both the automatic tuner 18 and the limiter 20. At this time, if a "Q" signal is included in the received program, an output signal is obtained at the phase detector 21, which in combination with the output from carrier wave detector 19, will stop the automatic tuner at the frequency to receive this particular program. The signal from the phase detector will also generate an output from the signal detector, assuming the selected Q signal is present, which in turn, will cause gate circuit 15 to transfer the receiver to its program receiving mode, i.e., gate circuit 15 will couple lead 41 to terminal 42 and disconnect input T, whereby the specific program is received. When the reception of the Q signal is stopped, the output from the phase detector 21 is eliminated and gate circuit 15 returns to its normal or tape-reproduce position, to continue the play of the tape, and the automatic tuner will then begin its scanning function.

When the Q signal is not included on the carrier wave detected by detector 19, no output is obtained at the phase detector 21 and the automatic tuner 18 continues the scanning operation.

Although this invention is explained for the case wherein it is applied to the reproduction of the recorded tape or the like, or applied to a car stereo, it is apparent for those skilled in the art that the invention also can be applied for controlling brightness or color of the room light from the broadcasting station so that the mood of the room can be adapted to the broadcasting program, or otherwise can be applied to television or other broadcasting systems.

As described above, according to the present invention, various advantageous features can be obtained, such as the assurance of hearing a specific radio program, for instance while a driver is listening to a car stereo, and also enabling the control of room light from the broadcasting station.

What we claim is:

1. A radio frequency receiver for use with a recorded source of reproducible signals and which is automatically tunable for responding only to selected carrier wave signals in a broadcast band of frequencies wherein at least some of said carrier wave signals may have first and second signals modulated thereon in a first and a second mode, respectively, and where said receiver is adapted to reproduce said first signals in response to a control signal derived from said second signals and corresponding to the instantaneous program content of the associated first signals said apparatus comprising:

automatic tuning means for continuously tuning said receiver to scan over said broadcast band unless stopped, first detecting means for detecting the presence of a carrier wave, second detecting means for detecting the presence of a carrier wave, second detecting means for detecting the presence of a second signal in said second mode, said automatic tuning means operatively connected to said first and second detecting means and including stopping means controlled by said first and second detecting means for stopping said continuous tuning upon simultaneous detection of said carrier wave and of said second signal, control means operatively connected to said second detecting means for generating said control signal and thus causing said receiver to selectively reproduce said first signals modulated in said first mode only for those carrier waves having said second signals in said second mode modulated thereon, third detector means for demodulating said first signals in said first mode, input means for connection to said recorded source of reproducible signals, reproducing means for reproducing both said first and said reproducible signals, and gating means connected to said input means, to said third detector means and to said control means for normally gating said reproducible signals to said reproducing means but for selectively interrupting the reproduction of said reproducing means in response to said control signal and for then gating said first signals in said first mode to said reproducing means.

2. A radio receiver as in claim 1 for use in a system where said second signals may have a plurality of discrete values corresponding to instantaneous program content of said signals and wherein:

said second detecting means includes means for distinguishing between said plurality of discrete values, and wherein said control means includes selective means for selectively responding to different ones of said discrete values and for generating different respectively corresponding values of said control signal thereby permitting the selective interruption of said reproducible signals for only the corresponding desired program contents of said first signals.

3. A radio receiver as in claim 2 wherein said means for selectively generating said control signal comprises frequency-selective signal detector means coupled to said second detector for providing an output corresponding to at least a selected frequency which, in turn, corresponds to one of said plurality of discrete values.

4. The apparatus of claim 2 wherein said third detector is an amplitude modulation detector and said second detector is a phase modulation detector.

5. The apparatus of claim 4 wherein said second detector includes:

a limiter means and phase detector means for reproducing said second signal, said limiter being operable in response to said first detector means, and said automatic tuning means being inoperative when both said second signal and said first signal exist simultaneously.

UNITED STATES PATENT OFFICE
CERTIFICATE OF CORRECTION

Patent No. 3,599,099 Dated August 10, 1971

Inventor(s) Akira Tatebayashi, et al.

It is certified that error appears in the above-identified patent and that said Letters Patent are hereby corrected as shown below:

Column 2, line 35, change "rf" to -- of --;

Column 3, line 3, after "limiter" insert -- is --;

Column 3, line 32, change "detection" to -- detector --;

Column 4, lines 40, 41, delete entire lines.

Signed and sealed this 18th day of April 1972.

(SEAL)
Attest

EDWARD M.FLETCHER,JR.
Attesting Officer

ROBERT GOTTSCHALK
Commissioner of Patents

M PO-1050 (10-69) 1770-4

USCOMM-DC 60376-P69
☆ U.S. GOVERNMENT PRINTING OFFICE : 1969 O—366-334